3,025,181
COATED FIBROUS PRODUCTS, COMPOSITIONS AND METHODS FOR MAKING THEM
Albert C. Nuessle, Hatboro, and Edwin H. Kroeker, Ivyland, Pa., assignors to Rohm & Haas Company, Philadelphia, Pa., a corporation of Delaware
No Drawing. Filed Sept. 4, 1959, Ser. No. 838,063
10 Claims. (Cl. 117—76)

This invention concerns improved coating compositions adapted to produce solvent-resistant coatings on flexible fibrous bases, especially those of textiles, leather, and paper. It also concerns the coated products and the methods for making them using the new coating compositions.

It has heretofore been proposed to include various thermosetting materials such as melamine-formaldehyde condensates in coating compositions based on polyacrylates but in general, such materials suffer one or more difficulties such as poor compatibility, inadequate capacity to render the coating insoluble, or excessive stiffening action when applied in sufficient proportion to give adequate resistance to solvents.

It is an object of the present invention to provide a coating composition which is adapted to be cured to a solvent-resistant condition without appreciably reducing the flexibility of the substrate to which it is applied. Another object of the present invention is to provide an improved multiple-layer coating system for such flexible fibrous articles. Other objects and advantages will be apparent from the description hereinafter.

In accordance with the present invention, it has been discovered that a composition comprising a mixture of (a) a cellulose ester selected from the group consisting of cellulose acetate propionate and cellulose acetate butyrate with (b) a copolymer of copolymerizable monoethylenically unsaturated monomers comprising about 1 to 10% by weight of glycidyl methacrylate with 70 to 99% by weight of at least one ester of acrylic acid with a saturated alcohol having from 1 to 18 carbon atoms is capable of producing a water-repellent or waterproof finish that is resistant to solvents and does not stiffen the fabric material objectionably. The proportions of (a) may be from 25 to 50% by weight of the entire mixture of (a) and (b) in the compositions that are employed as the final topcoat.

Before applying the final topcoat as just defined, one or more softer initial coats may be applied. These initial coats may consist of the glycidyl methacrylate copolymers or may comprise a mixture of 90 to 99% or more of the copolymer with up to 10% by weight of the cellulose ester, either the cellulose acetate butyrate or the cellulose acetate propionate.

The cellulose ester that may be used may be any of those having viscosities of about 0.1 to 2.0 seconds as determined by ASTM Method D–H71–48, Formula B. These grades of the cellulose ester can be prepared according to known methods.

The copolymer of the glycidyl methacrylate may be that with methyl acrylate, ethyl acrylate, isopropyl acrylate, n-propyl acryate, n-butyl acrylate, other butyl acrylates, 2-ethylhexyl acrylate, lauryl acrylate or octadecyl acrylate. Besides the glycidyl methacrylate and alkyl acrylate, the copolymer may comprise up to 20% by weight of cyclohexyl acrylate, benzyl acrylate, methacrylates, such as methyl methacrylate, ethyl methacrylate and butyl methacrylate, vinyl toluene, acrylonitrile, vinyl actetate, or vinylidene chloride. The copolymer may be prepared in any suitable fashion provided it has a molecular weight in the range of about 50,000 to 250,000 viscosity average. Generally, this molecular weight is most easily obtained by solution polymerization or by emulsion polymerization with use of chain-transfer agents.

Both the base coat or coats and the final coat or coats are applied from organic solvent solutions. The copolymer or blend of the copolymer with the cellulose ester may be at a concentration from 20 to 45% by weight in the solutions and as solvents any suitable solvents for the two materials may be employed. Examples include methanol, ethanol, isopropanol, ethyl acetate, methyl acetate, acetone, methyl ethyl ketone, dioxane, the methyl, ethyl, or butyl mono-ethers of ethylene glycol, 2-ethoxyethyl acetate, 2-ethoxyethyl propionate, or 2-ethoxyethyl butyrate. Mixtures of these solvents may be employed as desired.

A small amount of an acid catalyst, such as about 0.1 to 1.5% by weight of the copolymer present in the composition, may be employed. Examples of suitable catalysts include butyl phosphoric acid, p-toluene sulfonic acid, oxalic acid, maleic acid, the mono-salt of maleic acid with an amine, such as triethylamine or triethanolamine, the salts of various amines, such as the hydrochloride, the hydroacetate, or the maleate of 2-methyl-2-aminopropanol-1, diethanolamine, and so on.

Any suitable method of applying the coating to the fabric may be employed such as roll-coating, knife-coating, spraying, brushing, or dipping. The concentration and viscosity are, of course, adjusted to the particular method intended to be used in applying the coatings to the substrates.

The coatings may be applied in succession to the substrates. After application of each coating, it is dried and, if desired, subjected to a baking step to cure the copolymer on the coated substrate. In any event, the final drying is followed by a curing or baking which may be effected at a temperature of 220° to 450° F. for a period of time that may be anywhere from about ½ minute to ½ hour or longer, the shorter time generally being used at the higher temperature and vice versa. Drying may be by exposure to the ambient atmosphere, hot-air oven, infra-red radiation, or by any other system.

The coatings may be applied to all sorts of textile fabrics, such as garments needing water-proofing. Thus, raincoats formed of nylon, vinyl resins, Dacron, cotton, rayon, or mixtures thereof can be rendered resistant to dry-cleaning as well as resistant to water and grease by the coating system herein disclosed.

The coatings are also useful for water-proofing or rendering water-repellent umbrellas, awnings, automobile seatcovers, knapsacks, and other items of textile fabrics. They may be used as well for the water-proofing of leather used in shoes, briefcases, and luggage of all sorts. Because of their grease-proofness and solvent resistance as well as their water-repellency, the coatings are useful as finishes for paper including paperboards, such as may be used as protective covers for books and the like.

The application of the undercoat or base coat prior to the application of the second coat is quite important. The composition first applied is relatively soft, forms an excellent bond with the base, and provides a high degree of flexibility in immediate proximity to the surfaces of the fibers upon which the base coat is applied. The topcoat is, as compared to the base coat, quite free from tackiness and provides a good exposed surface substantially free of grab, that is of the tendency to cling to any surface upon which the coated article is pressed. By providing glycidyl methacrylate in both coatings, resistance to dry-cleaning is imparted throughout the entire thickness of the coating. At the same time, this solvent-resistance is obtained without sacrifice of flexibility and draping qualities of the base particularly when it is a textile fabric forming part of a garment.

In the examples which are illustrative of the invention, the parts and percentages are by weight unless otherwise specifically indicated.

Example 1

(a) Into a stainless steel kettle, fitted with stirrer, condenser, thermometer and equipped for heating and cooling was charged 1,377 parts methanol and the contents were heated to reflux. To the refluxing methanol was added during one hour a mixture of 48 parts glycidyl methacrylate monomer
1152 parts ethyl acrylate monomer
12 parts benzoyl peroxide
153 parts ethyl acetate.

Additional charges of 1.2 parts benzoyl peroxide were added after 4 and 6 hours. At the end of 9 hours the mixture was cooled, analyzed and diluted with a 9/1 mixture of methanol/ethyl acetate to 40% solids.

(b) Sixty-six parts of the product from part (a) was blended with 13.6 parts half-second cellulose acetate-butyrate, 18.4 parts methanol and 2.0 parts ethyl acetate. This blend was combined with 1% n-butyl phosphoric acid (solids basis) and applied as the top coat of a 2-coat system on fabrics.

(c) The solution of part (a) was blended with 1% (on the weight of copolymer) of n-butyl phosphoric acid and the resulting solution was applied to a nylon taffeta fabric by a floating knife coater at a rate of about ¼ oz. per sq. yd. to provide a base coat thereon, after which the coated fabric was dried at 240° F. for five minutes. The solution of part (b) was blended with 1% (on weight of solids) of n-butyl phosphoric acid and applied as the topcoat over the base-coated fabric at a rate of about ¼ oz. per sq. yd. After drying at 240° F. for five minutes and curing at 300° F. for ten minutes, the coated fabric obtained had excellent resistance to washing and drycleaning.

Example 2

(a) The preparation of Example 1(a) was repeated except that the methanol solvent was replaced with 1300 parts 95% ethyl alcohol and the 153 parts ethyl acetate replaced with 230 parts ethyl acetate. Upon cooling, analysis and dilution to 40% with an 85/15 mixture of ethyl alcohol/ethyl acetate, the viscosity was 200 poises.

(b) Sixty-six parts of the product from part (a) was blended with 34 parts of a 40% solution of half-second cellulose acetate-butyrate in ethyl alcohol/ethyl acetate (85/15).

(c) The solutions of parts (a) and (b) were combined with 1% (solids basis) of p-toluene sulfonic acid and applied as in Example 1(c) as base and top coats respectively, drying and curing as before. The coated fabric had excellent washfastness and dryclean-fastness.

Example 3

(a) The preparation of Example 1(a) was repeated by charging 2100 parts toluene to the kettle and heating to reflux. To the refluxing solvent during 1 hour was added a mixture of 36 parts glycidyl methacrylate monomer
1164 parts ethyl acrylate monomer
18 parts benzoyl peroxide
700 parts toluene.

Additional charges of 1.2 parts benzoyl peroxide were added after 5 and 7 hours. At the end of 10 hours the mixture was cooled, analyzed for solids and diluted to 25% solids with toluene.

(b) Sixty-six parts of the product from part (a) was blended with 34 parts of a 25% solution of half-second cellulose acetate butyrate in toluene 95% ethyl alcohol 1/1.

(c) The solutions of parts (a) and (b) were combined with 1% (solids basis) of p-toluene sulfonic acid and applied as in Example 1(c) as base and top coats respectively, drying and curing as before. The coated fabric had excellent washfastness and dryclean-fastness.

Example 4

(a) In to a stainless steel kettle, fitted with stirrer, condenser, thermometer and equipped for heating and cooling was charged 600 parts ethyl acetate and heated to reflux. To the refluxing solvent was added during one hour a mixture of:

18 parts glycidyl methacrylate monomer
438 parts ethyl acrylate monomer
144 parts butyl acrylate monomer
1.2 parts benzoyl peroxide.

After 4 hours 0.6 part benzoyl peroxide and 500 parts ethyl acetate were added during 2 hours. After heating a total of 9 hours the mixture was cooled, analyzed and diluted to 25% solids with additional ethyl acetate solvent.

(b) Sixty-six parts of the product from part (a) was blended with 18.5 parts half-second cellulose acetate-butyrate and 25.5 parts ethyl acetate solvent.

(c) The solutions of parts (a) and (b) were combined with 1% (solids basis) of p-toluene sulfonic acid and applied as in Example 1(c) as base and top coats respectively, drying and curing as before. The coated fabric had excellent washfastness and dryclean-fastness.

Example 5

(a) The preparation of Example 4(a) was repeated except that to the refluxing ethyl acetate solvent was added a mixture of:

18 parts glycidyl methacrylate monomer
60 parts decyl-octyl methacrylate monomer (a mixture of methacrylates from decyl to octyl)
522 parts ethyl acrylate monomer (b) Sixty parts of the product from part (a) was blended with 10 parts half-second cellulose acetate-butyrate and 30 parts ethyl acetate.

(c) The solutions of parts (a) and (b) were combined with 1% (solids basis) of p-toluene sulfonic acid and applied as in Example 1(c) as base and top coats respectively, drying and curing as before. The coated fabric had excellent washfastness and good dryclean-fastness.

Example 6

(a) The preparation of Example 4(a) was repeated except that to the refluxing ethyl acetate solvent was added a mixture of:

18 parts glycidyl methacrylate monomer
60 parts 2-ethylhexyl acrylate monomer
522 parts ethyl acrylate monomer (b) Seventy parts of the product from part (a) was blended with 7.5 parts half-second cellulose acetate-butyrate and 22.5 parts ethyl acetate.

(c) The solutions of parts (a) and (b) were combined with 1% (solids basis) of n-butyl phosphoric acid and applied as in Example 1(c) as base and top coats respectively, drying and curing as before. The coated fabric had excellent washfastness and dryclean fastness.

Example 7

(a) The preparation of Example 4(a) was repeated except that to the refluxing ethyl acetate solvent was added a mixture of:

18 parts glycidyl methacrylate monomer
30 parts vinyl stearate monomer
552 parts ethyl acrylate monomer (b) Sixty-seven parts of the product from part (a) was blended with 8.3 parts half-second cellulose acetate-butyrate and 24.7 parts ethyl acetate.

(c) The solutions of parts (a) and (b) were combined with 1% (solids basis) of n-butyl phosphoric acid and applied as in Example 1(c) as base and top coats respectively, drying and curing as before. The coated fabric had excellent washfastness and dryclean fastness.

*Example 8*

(a) The preparation of Example 4(a) was repeated except that to the refluxing ethyl acetate solvent was added a mixture of:

24 parts glycidyl methacrylate monomer
576 parts methyl acrylate monomer (b) Seventy-five parts of the product from part (a) was blended with 6.2 parts of half-second cellulose acetate-butyrate and 18.8 parts ethyl acetate.

(c) The solutions of parts (a) and (b) were combined with 1% (solids basis) of n-butyl phosphoric acid and applied as in Example 1(c) as base and top coats respectively, drying and curing as before. The coated fabric had excellent washfastness and dryclean-fastness.

*Example 9*

(a) The preparation of Example 4(a) was repeated except that to the refluxing solvent was added a mixture of:

24 parts glycidyl methacrylate monomer
288 parts methyl acrylate monomer
288 parts ethyl acrylate monomer (b) Sixty-six parts of the product from part (a) was blended with 8.5 parts half-second cellulose acetate-butyrate and 25.5 parts ethyl acetate.

(c) The solutions of parts (a) and (b) were combined with 1% (solids basis) of n-butyl phosphoric acid and applied as in Example 1(c) as base and top coats respectively, drying and curing as before. The coated fabric had excellent washfastness and dryclean-fastness.

*Example 10*

(a) The preparation of Example 4(a) was repeated except that to the refluxing solvent was added, a mixture of:

24 parts glycidyl methacrylate monomer
60 parts methyl methacrylate monomer
516 parts ethyl acrylate monomer (b) Seventy parts of the product from part (a) was blended with 7.5 parts half-second cellulose acetate-butyrate and 22.5 parts ethyl acetate solvent.

(c) The solutions of parts (a) and (b) were combined with 1% (solids basis) of n-butyl phosphoric acid and applied as in Example 1(c) as base and top coats respectively, drying and curing as before. The coated fabric had excellent washfastness and dryclean-fastness.

*Example 11*

(a) The preparation of Example 4(a) was repeated except that to the refluxing solvent was added, a mixture of:

24 parts glycidyl methacrylate monomer
120 parts butyl methacrylate monomer
456 parts ethyl acrylate monomer.

(b) Sixty-six parts of the product from part (a) was blended with 8.5 parts of half-second cellulose acetate-butyrate and 25.5 parts ethyl acetate solvent.

(c) The solutions of parts (a) and (b) were combined with 1% (solids basis) of n-butyl phosphoric acid and applied as in Example 1(c) as base and top coats respectively, drying and curing as before. The coated fabric had excellent washfastness and dryclean-fastness.

It is to be understood that changes and variations may be made without departing from the spirit and scope of the invention as defined in the appended claims.

We claim:

1. An article of manufacture comprising a flexible fibrous base waterproofed by a base coating comprising a copolymer of copolymerizable monoethylenically unsaturated monomers comprising about 1 to 10% by weight of glycidyl methacrylate and about 70 to 99% by weight of at least one ester of acrylic acid with a saturated alcohol having 1 to 18 carbon atoms in adherent contact with at least the fibers at the surface of the base, and, in adherent contact with the base coating, a topcoating comprising 25 to 50% by weight of an ester selected from the group consisting of cellulose acetate propionate and cellulose acetate butyrate and 50 to 75% by weight of a copolymer of copolymerizable monoethylenically unsaturated monomers comprising about 1 to 10% by weight of glycidyl methacrylate and about 90 to 99% by weight of at least one ester of acrylic acid with a saturated alcohol having 1 to 4 carbon atoms, the coatings of the article being in a cured condition resistant to solvents.

2. An article of manufacture comprising a flexible fibrous base waterproofed by a base coating comprising a copolymer of 90 to 99% by weight of ethyl acrylate with about 1 to 10% by weight of glycidyl methacrylate in adherent contact with at least the fibers at the surface of the base, and, in adherent contact with the base coating, a topcoating comprising 25 to 50% by weight of cellulose acetate butyrate and 50 to 75% by weight of a copolymer of about 90 to 99% by weight of ethyl acrylate with about 1 to 10% by weight of glycidyl methacrylate, the coatings of the article being in a cured condition resistant to solvents.

3. An article as defined in claim 2 in which the fibrous base is a textile fabric.

4. An article as defined in claim 2 in which the fibrous base is leather.

5. An article as defined in claim 2 in which the fibrous base is formed of a paper.

6. A method of water-proofing a flexible, fibrous article which comprises applying to the article a coating composition comprising a copolymer of copolymerizable monoethylenically unsaturated monomers comprising about 1 to 10% by weight of glycidyl methacrylate and about 70 to 99% by weight of at least one ester of acrylic acid with a saturated alcohol having 1 to 18 carbon atoms, drying the coated article, then applying a coating composition comprising 25 to 50% by weight of an ester selected from the group consisting of cellulose acetate propionate and cellulose acetate butyrate and 50 to 75% by weight of a copolymer of copolymerizable monoethylenically unsaturated monomers comprising about 1 to 10% by weight of glycidyl methacrylate and about 75 to 99% by weight of at least one ester of acrylic acid with a saturated alcohol having 1 to 4 carbon atoms, drying the article and curing the coatings thereon by heating the article to a temperature of 220° to 450° F. to render the coatings resistant to solvents.

7. A coating composition comprising 25 to 50% by weight of a cellulose ester selected from the group consisting of cellulose acetate propionate and cellulose acetate butyrate and 50 to 75% by weight of a copolymer of copolymerizable monoethylenically unsaturated monomers comprising 1 to 10% by weight of glycidyl methacrylate and 70 to 99% by weight of an ester of acrylic acid with an alkanol having 1 to 18 carbon atoms.

8. An article of manufacture comprising a flexible fibrous base waterproofed by a base coating comprising a copolymer of copolymerizable monoethylenically unsaturated monomers consisting of about 1 to 10% by weight of glycidyl methacrylate, at least about 70% by weight of at least one ester of acrylic acid with a saturated alcohol having 1 to 18 carbon atoms and up to 20% by weight of at least one monomer selected from the group consisting of benzyl acrylate, methyl acrylate, ethyl methacrylate, butyl methacrylate, vinyltoluene, acrylonitrile, vinyl acetate, and vinylidene chloride in adherent contact with at least the fibers at the surface of the base, and, in adherent contact with the base coating, a topcoating comprising a film-forming binder consisting of 25 to 50% by weight of an ester selected from the group consisting of cellulose acetate propionate and cellulose acetate butyrate and 50 to 75% by weight of a copolymer of copolymerizable monoethylenically unsaturated monomers consisting of about 1 to 10% by weight of glycidyl methacrylate and about 90 to 99% by weight of at least one ester of acrylic acid with a saturated alcohol having 1 to 4 carbon atoms, the coatings of the article being in a cured condition resistant to solvents.

9. A coating composition comprising a film-forming binder consisting of 25 to 50% by weight of a cellulose ester selected from the group consisting of cellulose acetate propionate and cellulose acetate butyrate and 50 to 75% by weight of a copolymer of copolymerizable monoethylenically unsaturated monomers consisting of 1 to 10% by weight of glycidyl methacrylate, at least 70% by weight of an ester of acrylic acid with an alkanol having 1 to 18 carbon atoms and up to 20% by weight of at least one monomer selected from the group consisting of benzyl acrylate, methyl methacrylate, ethyl methacrylate, butyl methacrylate, vinyltoluene, acrylonitrile, vinyl acetate and vinylidene chloride.

10. A method of water-proofing a flexible, fibrous article which comprises applying to the article a coating composition comprising a copolymer of copolymerizable monoethylenically unsaturated monomers consisting of about 1 to 10% by weight of glycidyl methacrylate, at least about 70% by weight of at least one ester of acrylic acid with a saturated alcohol having 1 to 18 carbon atoms and up to 20% by weight of at least one monomer selected from the group consisting of benzyl acrylate, methyl methacrylate, ethyl methacrylate, butyl methacrylate, vinyltoluene, acrylonitrile, vinyl acetate, and vinylidene chloride, drying the coated article, then applying a coating composition comprising a film-forming binder consisting of 25 to 50% by weight of an ester selected from the group consisting of cellulose acetate propionate and cellulose acetate butyrate and 50 to 75% by weight of a copolymer of copolymerizable monoethylenically unsaturated monomers consisting of about 1 to 10% by weight of glycidyl methacrylate and about 75 to 99% by weight of at least one ester of acrylic acid with a saturated alcohol having 1 to 4 carbon atoms, drying the article and curing the coatings thereon by heating the article to a temperature of 220° to 450° F. to render the coatings resistant to solvents.

References Cited in the file of this patent

UNITED STATES PATENTS

| | | |
|---|---|---|
| 2,723,971 | Cupery | Nov. 15, 1955 |
| 2,865,870 | Pinder | Dec. 23, 1958 |
| 2,881,091 | Schulze | Apr. 7, 1959 |